No. 874,524.  
PATENTED DEC. 24, 1907.  
R. MOOS.  
FOOD MIXER.  
APPLICATION FILED OCT. 18, 1906.
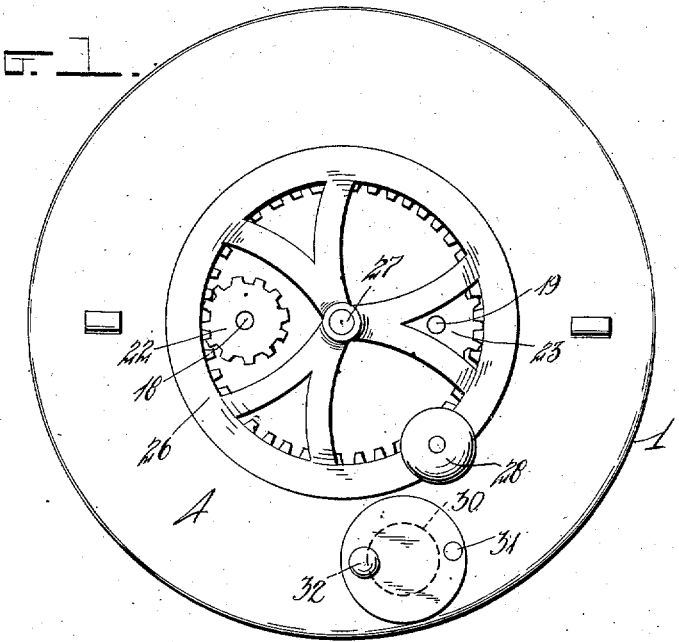
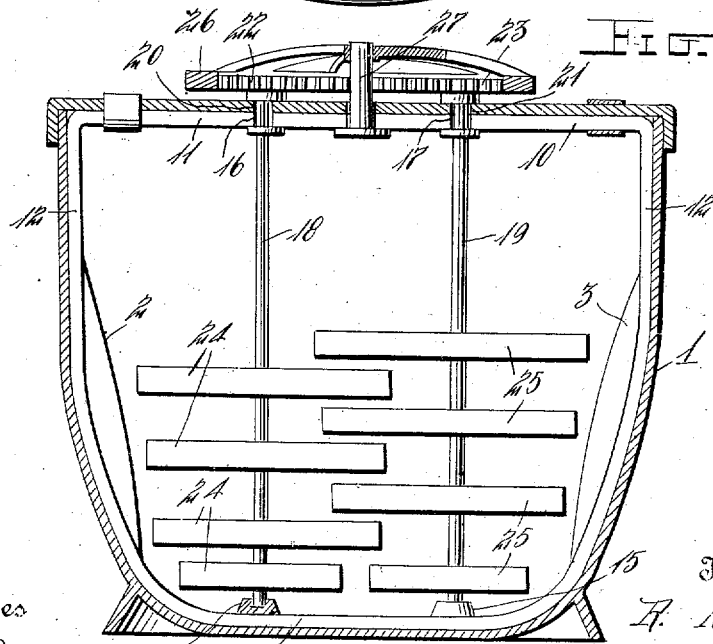

UNITED STATES PATENT OFFICE.

REINHOLD MOOS, OF PLACERVILLE, CALIFORNIA.

FOOD-MIXER.

No. 874,524.　　　Specification of Letters Patent.　　　Patented Dec. 24, 1907.

Application filed October 18, 1906. Serial No. 339,524.

*To all whom it may concern:*

Be it known that I, REINHOLD MOOS, a citizen of the United States, residing at Placerville, in the county of Eldorado and State of California, have invented certain new and useful Improvements in Food-Mixers; and I do declare the following to be a full, clear, and exact description of the invention, such as will enable others skilled in the art to which it appertains to make and use the same.

This invention relates to an improved food mixer or beater.

The object of the invention is to provide a vessel with beater mechanism which is mounted in a skeleton frame connected with the top or lid so that all the working parts may be withdrawn on the removal of the cover.

In the accompanying drawings in which corresponding parts are indicated by the same reference characters, Figure 1 represents a top plan view of a vessel with the beater mechanism in place therein. Fig. 2 represents a vertical section through the vessel showing the beater frame in side elevation.

Referring more particularly to the drawings a vessel 1 for containing the substance to be mixed or beaten is made of any suitable material and in any desired form. This vessel 1 is preferably provided with guide flanges 2 and 3 arranged on its opposite inner faces and with a removable lid or cover 4. Attached in any suitable manner to the inner face of the cover 4 is a beater frame 10 composed of a cross rod or bar 11 having depending legs 12 connected at their lower ends by a transverse bar or rod 13, all of said parts being preferably made integral and of a shape to conform to the interior of the vessel to which it is to be applied. This skeleton frame 10 is adapted to slide in the guideways formed by the flanges 2 and 3 of the vessel 1 and is held thereby in fixed position. The transverse bottom bar 13 has sockets 14 and 15 formed therein and the top cross bar 11 has apertures 16 and 17 to receive the spindles of the dashers now to be described. Spindles 18 and 19 have their lower ends disposed in said sockets 14 and 15 in the bar 13 and their upper ends are projected through the apertures 16 and 17 in the cross bar 11 and through registering apertures 20 and 21 in the lid. These projecting ends are provided with operating gears or pinions 22 and 23. Blades 24 and 25 are secured to the spindles 18 and 19, the blades of one spindle being preferably staggered in relation to those of the other spindle.

A cog wheel 26 is mounted to rotate on a stub shaft 27 secured to the outer face of the lid 4 and is arranged to mesh with the gears 22 and 23 of the spindles to turn the dashers. This cog wheel is provided with a handle 28 for operating it.

The lid or cover 4 has an opening 29 therein shown in dotted lines in Fig. 1 provided with a disk cover 30, pivoted at 31 and having a knob 32 for swinging the disk back and forth to cover and uncover the opening. This opening is designed to admit air to the contents of the vessel, and additions may be made therethrough to the contents in the vessel during the mixing operation, for instance, when making mayonnaise dressing, the olive oil is added drop by drop through the opening 30 during the beating of the other ingredients.

I claim as my invention:

A food beater or mixer comprising a containing vessel provided with oppositely-disposed guides on the inner face of the sides thereof, a lid for said vessel, a beater frame secured to said lid and removable therewith from said vessel, and comprising a cross bar having depending legs connected by a transverse bar, said legs fitting between and held in position by said guides prevent rotation of said frame, dashers journaled at one end in said transverse bar with their free ends projecting through apertures in said cross bar and through said lid, gears on said projecting ends, and a cog wheel meshing with said gears and provided with operating means.

In testimony whereof I have hereunto set my hand in presence of two subscribing witnesses.

REINHOLD MOOS.

Witnesses:
J. H. BRADLEY,
GEO. B. KITT.